Figure 2:
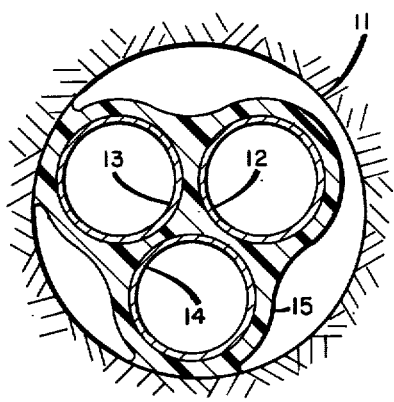

Nov. 12, 1963    G. C. HOWARD ET AL    3,110,347
METHOD OF CEMENTING PARALLEL TUBES IN A WELL
Filed Dec. 29, 1961

GEORGE C. HOWARD
EARL R. JENNINGS
    INVENTORS.

BY *[signature]*

ATTORNEY.

United States Patent Office 3,110,347
Patented Nov. 12, 1963

3,110,347
METHOD OF CEMENTING PARALLEL TUBES IN A WELL
George C. Howard and Earl R. Jennings, Tulsa, Okla., assignors to Pan American Petroleum Corporation, Tulsa, Okla., a corporation of Delaware
Filed Dec. 29, 1961, Ser. No. 163,229
5 Claims. (Cl. 166—46)

Our invention concerns a method of cementing multiple strings of tubing in a well. More precisely, it relates to a method wherein a rigid, partially polymerized resin is used to seal the interstice between the strings of tubing.

Oil and gas wells producing from two or more zones are completed sometimes without first cementing a string of casing through the zones to be produced. A separate string of tubing is run in the well for each zone to be produced. After these strings of tubing have been suspended in the well, a cement slurry is circulated down the tubing and up the well outside the tubing strings displacing well fluids. After the cement has set, a perforating gun is run down one string of tubing and fired to perforate the tubing and cement opposite one of the producing zones. The other strings of tubing are then perforated at other producing horizons so that fluids from each zone can be produced without mixing with fluids from other zones. The cement filling the well outside the tubing is intended to prevent communication in the well between the several producing zones.

Vertical communication has been found between adjacent zones in some wells completed in this manner. Analysis of the problem has revealed the probable cause of the communication to be incomplete displacement of the well fluids by the cement slurry. It is probable that cement does not fill the interstice between the strings of tubing, particularly when three or more strings are in parallel. The drilling fluid or other well fluid which was trapped in the interstice was eventually displaced by the produced fluids, thereby providing fluid communication between the perforated intervals.

When multiple strings of tubing are run in a well, they have a tendency to hang together in a bundle owing to the random deviation of the well from vertical. The small clearance between the tubings restricts the circulation of cement slurry through the interstice, enabling well fluids to be trapped between them. We take advantage of this tendency to hang together in providing one or more positive barriers to vertical communication. The barrier is produced by placing a blanket of a partially-polymerized resin around each string of tubing at a position where the coated sections will be at the same level when the pipe is suspended in the well. These resins are preferably at the "B" stage of the cure cycle. At this stage they have thermoplastic properties, i.e., they are fairly rigid at normal temperatures and can be softened by heating. The resin blankets on the separate strings of tubing flow together at the temperature prevailing in the well and under the influence of the lateral forces which cause the tubings to hang in a bundle. The resin is extruded from the areas of contact between the tubings and fills the regions of close clearance between adjacent strings. Thereafter, a cement slurry circulating past such a resinous plug will have little difficulty in displacing well fluids between the plugs and the well walls.

Figure 1:
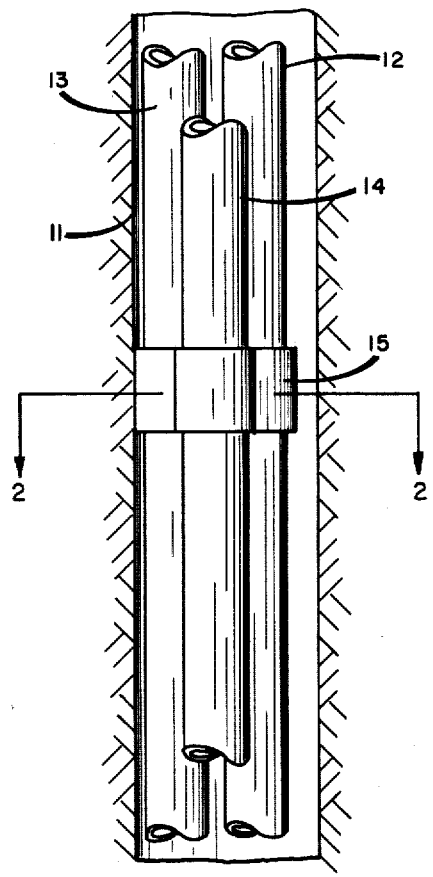

FIGURE 1 illustrates the principle of our invention when used in a well containing multiple strings of tubing.

FIGURE 2, a cross-sectional view at 2—2 in FIGURE 1, shows the manner in which the partially-polymerized resin seals the interstices between the tubing strings.

Figure 3:
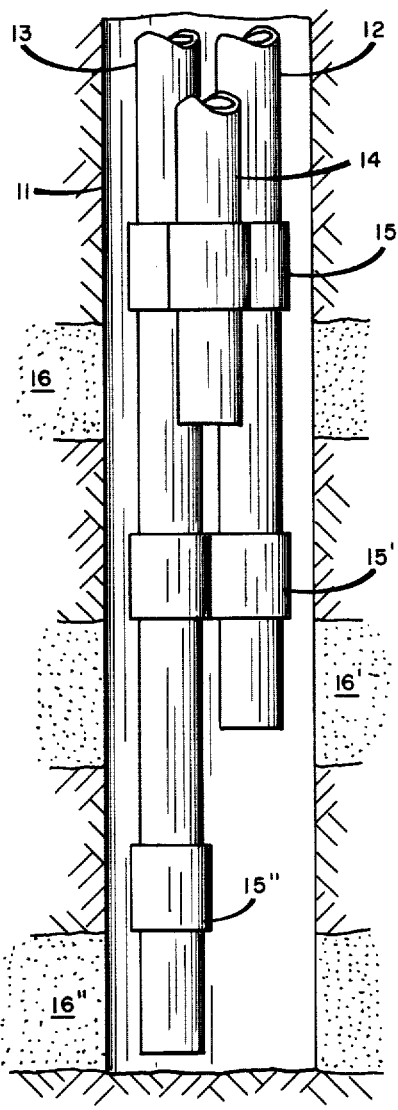

FIGURE 3 illustrates the arrangement of apparatus when our method is used to cement a well producing from three separated intervals.

Three strings of tubing, 12, 13, and 14, are shown in well 11 of FIGURE 1. Owing to the deviation of the well from vertical, the freely-suspended strings of tubing hang close together as they touch alternate sides of the well. Blankets 15 of partially-polymerized resin applied to each string of tubing before they are run in the well, are placed so that they will be at the same level when the tubings are suspended in the well. In FIGURE 2, it is seen that tubings 13 and 14 hang against the side of well 11 with tubing 12 hanging against tubings 13 and 14. The resulting lateral pressure on the resin extrudes a portion of it into the narrow spaces between the tubings and between the tubings and the edge of the hole. The resin thus eliminates the crevices at this level which are likely to trap well fluids and prevent satisfactory sealing with cement. In FIGURE 3 it can be seen how resin blankets 15, 15' and 15'' may be placed to provide a seal between producing intervals 16, 16' and 16''.

In practicing our method of cementing a well, the resin blankets are applied to the tubing as the strings are run in the well. The blankets are placed at positions between the producing intervals to be separated. Referring to FIGURE 3, blanket 15'' is placed on tubing 13 so that it will land between producing intervals 16' and 16''. Blankets 15' are applied to tubings 12 and 13 so that they will land at the same level between producing intervals 16 and 16'. Thereafter blankets 15 are placed on tubings 12, 13, and 14 at positions calculated to coincide above upper producing zone 16. This procedure may be continued for additional producing intervals.

As an alternative, that part of the well below interval 16' having only a single string of tubing can be cemented using a centralizer on the tubing to promote uniform displacement of the well fluids. We prefer to use the resin blanket and avoid any problems owing to the failure to displace all well fluids around the centralizer. Also, it is preferable to cement the tubing near the wall of the well so that perforations will not have to penetrate so much cement to reach the producing formation. In some wells it might be desirable to place the resin blankets at levels determined by reference to a log of hole deviation or inclination. A better seal is usually produced when the blankets are at a position where the tubings do not contact the well wall.

When the tubings are landed at the proper levels in the well and suspended from the well head, a cement slurry is circulated down lower tubing 13, displacing well fluids in the annulus toward the surface. All of the cement slurry may be pumped through this single string of tubing or part of the cement may be introduced through tubings 12 and 14 after the well fluids have been displaced below the outlets of these tubings. The tubing can be perforated when the cement has developed sufficient strength. An oriented perforating device must be used to avoid perforating into an adjacent tubing.

The partially-polymerized "B" staged resin used on the blankets must be one that bonds well to the tubing and does not shrink during the completion of polymerization. Also, it must have a consistency such that it can be plastered on the tubing, then solidify to a rigid mass having sufficient strength and hardness to prevent its destruction as it is being run in the well. The resin must soften at well temperature so that plastic flow can occur to fill the interstices. The polymerization is completed at this elevated temperature, resulting in a hard, impervious resin seal about the tubings.

The epoxy resins have the properties necessary for use in our method of cementing. A suitable resin-casting mixture contains bisphenol A and epichlorohydrin in proportions so that about 185–205 grams of resin contain one gram-equivalent of epoxide group. A variety of curing agents for the epoxy resins are commercially available. The aromatic diamines such as m-phenylene diamine are particularly suitable for producing the "B" stage of cure or polymerization. The resin casting mixture is blended with the curing agent, then applied to the tubing as a paste before the solid gel state develops which is characteristic of the "B" stage of cure. The ratio of curing agent to casting mixture is usually between 10 and 15 parts by weight of curing agent per one hundred parts of casting mixture. The exact amount used is determined by the activity of the particular agent and the pot life which is desired.

The resin blankets on the tubing will soften at well temperatures so that the lateral pressure between the separate tubing strings and the well wall will extrude a portion of the resin into the narrow crevices. Further curing of the resin will also occur so that the blankets will ultimately become hard and strong. A preferred "B" stage resin is a solid at temperatures below about 100° F. and softens to a pliant mass at temperatures above about 125° F. In the presence of an activator or curing agent, the resin completes polymerization at about 125° F.

Although our invention hts been described with reference to the cementing of multiple tubing strings, it should be understood that it can be used to advantage in cementing a single string of tubing. In that instance the resin blanket is preferably placed at a point where the tubing contacts the formation between the petroleum bearing zone and another zone, such as one containing water, which it is desirable to exclude. The resin seals the narrow channels between the tubing and the wall of the well, thereby reducing the possibility of vertical communication.

We claim:
1. A method of cementing parallel strings of tubing in a well (penetrating multiple producing zones) comprising:
   coating portions of each of said strings of tubing with a partially-polymerized resin in a solid state at surface temperatures, partially liquefied at formation temperatures, and containing a curing agent which will solidify the resin upon continued heating at formation temperatures,
   lowering said strings of tubing into said well whereby said resin-coated portions of said tubings are at substantially the same level in said well.
   and placing a cement slurry in said well surrounding said strings of tubing.
2. A method of cementing parallel strings of tubing in a well (penetrating multiple producing zones) comprising:
   coating portions of each of said strings of tubing with a plastic, a partially-polymerized resin in a solid state at surface temperatures, partially liquefied at formation temperatures, and containing a curing agent which will solidify the resin upon continued heating at formation temperatures,
   running said strings of tubing into said well whereby said resin-coated portions are at substantially the same level in said well, and
   circulating a cement slurry down at least one of said parallel strings of tubing and up the well annulus surrounding said tubing and said resin.
3. A method of cementing a tubing in a well comprising:
   coating a section of said tubing with a partially-polymerized resin in a solid state at surface temperatures, partially liquefied at formation temperatures, and containing a curing agent which will solidify the resin upon continued heating at formation temperatures,
   placing said tubing in said well, so that the coated section is at the level where a seal is desired between said tubing and the well wall, and
   placing a cement slurry in said well surrounding said coated section of tubing.
4. The method of claim 1 wherein
   said partially-polymerized resin is a solid at temperatures below about 100° F. and softens to a pliant mass at temperatures above about 125° F., and
   said resin contains an activator which completes the polymerization at temperatures above about 125° F. to produce a solid mass.
5. A method of cementing parallel strings of tubing in a well containing a liquid and penetrating multiple producing zones comprising:
   coating portions of each of said strings of tubing with a partially-polymerized resin in a solid state at surface temperatures, partially liquefied at formation temperatures, and containing a curing agent which will solidify the resin upon continued heating at formation temperatures, said coatings being applied at intervals whereby the coated portions of each string are at the same level as the coated portions of adjacent strings when said strings of tubing are suspended in said well,
   lowering said strings of tubing into said well, and
   injecting a cement slurry in said well to displace said liquid surrounding said coated portions of said tubing.

References Cited in the file of this patent
UNITED STATES PATENTS

| | | |
|---|---|---|
| 2,294,294 | Grebe | Aug. 25, 1942 |
| 2,939,533 | Coberly | June 7, 1960 |
| 3,022,823 | Caldwell et al. | Feb. 27, 1962 |

UNITED STATES PATENT OFFICE

CERTIFICATE OF CORRECTION

Patent No. 3,110,347             November 12, 1963

George C. Howard et al.

It is hereby certified that error appears in the above numbered patent requiring correction and that the said Letters Patent should read as corrected below.

Column 1, line 64, for "plugs" read -- plug --; column 3, line 22, for "hts" read -- has --; line 52, strike out "a", second occurrence.

Signed and sealed this 28th day of April 1964.

(SEAL)
Attest:

ERNEST W. SWIDER
Attesting Officer

EDWARD J. BRENNER
Commissioner of Patents